(12) United States Patent
Grawrock

(10) Patent No.: US 7,707,629 B2
(45) Date of Patent: *Apr. 27, 2010

(54) PLATFORM CONFIGURATION REGISTER VIRTUALIZATION APPARATUS, SYSTEMS, AND METHODS

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1217 days.

This patent is subject to a terminal disclaimer.

(21) Appl. No.: 11/095,034

(22) Filed: Mar. 31, 2005

(65) Prior Publication Data

US 2006/0230401 A1 Oct. 12, 2006

(51) Int. Cl.
*G06F 21/00* (2006.01)

(52) U.S. Cl. .............................. 726/12; 726/15; 726/19; 726/26; 713/2; 713/164; 718/1

(58) Field of Classification Search ................. 713/164, 713/2; 726/12, 15, 19, 26; 718/1
See application file for complete search history.

(56) References Cited

U.S. PATENT DOCUMENTS

| 5,109,515 | A  | * | 4/1992 | Laggis et al. ................. 707/10 |
| 6,366,297 | B1 | * | 4/2002 | Feagans ....................... 715/736 |
| 7,058,768 | B2 |   | 6/2006 | Willman et al. ............. 711/154 |
| 7,191,464 | B2 | * | 3/2007 | Cromer et al. ................. 726/2 |
| 7,412,596 | B2 | * | 8/2008 | Challener et al. .............. 713/2 |
| 7,484,099 | B2 | * | 1/2009 | Bade et al. .................. 713/176 |
| 2002/0194496 | A1 | * | 12/2002 | Griffin et al. ................. 713/200 |
| 2003/0033495 | A1 | * | 2/2003 | Lawman et al. ............. 711/163 |
| 2003/0061485 | A1 |   | 3/2003 | Smith et al. |
| 2003/0110372 | A1 | * | 6/2003 | Proudler ...................... 713/150 |
| 2003/0115453 | A1 |   | 6/2003 | Grawrock |
| 2003/0196083 | A1 | * | 10/2003 | Grawrock et al. ........... 713/156 |
| 2004/0039937 | A1 |   | 2/2004 | Aissi et al. |
| 2004/0039946 | A1 |   | 2/2004 | Smith et al. |
| 2005/0060568 | A1 | * | 3/2005 | Beresnevichiene et al. .. 713/200 |
| 2005/0081065 | A1 | * | 4/2005 | Brickell et al. .............. 713/202 |
| 2005/0081199 | A1 | * | 4/2005 | Traut .............................. 718/1 |
| 2005/0138370 | A1 | * | 6/2005 | Goud et al. .................. 713/164 |
| 2005/0149730 | A1 |   | 7/2005 | Aissi et al. |
| 2005/0210467 | A1 | * | 9/2005 | Zimmer et al. ................. 718/1 |
| 2005/0216736 | A1 |   | 9/2005 | Smith |

(Continued)

OTHER PUBLICATIONS

Tal Garfinkel, Ben Pfaff, Jim Chow, Mendel Rosenblum, Dan Boneh; "Terra: A Virtual Machine-Based Platform for Trusted Computing"; ACM Symposium on Operating Systems Principles; Oct. 19-22, 2003; pp. 193-206.*

(Continued)

*Primary Examiner*—Carl Colin
(74) *Attorney, Agent, or Firm*—Schwegman, Lundberg & Woessner, P.A.

(57) ABSTRACT

Apparatus and systems, as well as methods and articles, may operate to intercept a first request to use a platform configuration register (PCR) directed to a first trusted platform module (TPM) port, a second request to use the PCR directed to the first TPM port, or both, and to re-direct the first and second requests to use the PCR to a second TPM port capable of accessing a first virtual static platform configuration register (VS-PCR) set and a second VS-PCR set.

20 Claims, 3 Drawing Sheets

U.S. PATENT DOCUMENTS

| | | | |
|---|---|---|---|
| 2006/0010326 A1* | 1/2006 | Bade et al. | 713/176 |
| 2006/0020785 A1 | 1/2006 | Grawrock et al. | |
| 2006/0075223 A1* | 4/2006 | Bade et al. | 713/162 |
| 2006/0206892 A1* | 9/2006 | Vega et al. | 718/1 |
| 2006/0212939 A1* | 9/2006 | England et al. | 726/22 |
| 2006/0230439 A1 | 10/2006 | Smith et al. | |
| 2007/0043896 A1* | 2/2007 | Daruwala et al. | 711/6 |

OTHER PUBLICATIONS

"U.S. Appl. No. 11/396, 266, Non-Final Office Action mailed Apr. 27, 2009", 17 pgs.

"U.S. Appl. No. 11/396,266, Response filed Jun. 17, 2009 to Non Final Office Action mailed Apr. 27, 2009", 11 pgs.

"U.S. Appl. No. 11/396,266, Final Office Action mailed Sep. 23, 2009", 23 pgs.

* cited by examiner

PLATFORM CONFIGURATION REGISTER VIRTUALIZATION APPARATUS, SYSTEMS, AND METHODS

TECHNICAL FIELD

Various embodiments described herein relate to trusted computing technology generally, including apparatus, systems, and methods used in virtualizing trusted platform module resources.

BACKGROUND INFORMATION

Establishing a secure computing environment may include creating trust relationships between various components of a computing platform to enhance authentication, integrity, confidentiality, and control associated with platform transactions. In some cases, the platform may utilize a shielded controller, sometimes called a "trusted platform module" (TPM). Additional information regarding the TPM may be found at the Trusted Computing Group website, www.trustedcomputinggroup.org/home, including "TPM Main Specification Version 1.2 Revision 62" (2 Oct. 2003). The TPM may operate to uniquely identify the platform globally, to construct and exchange encryption keys, and to perform other tasks associated with establishing and enforcing the secure computing environment.

The TPM may provide access to one or more sets of registers, perhaps internal to the TPM, sometimes referred to as a "platform configuration register (PCR) set." A basic input-output system (BIOS), an operating system (OS), or a software application may detect one or more values associated with a platform resource and store a hash calculation performed on the one or more values in the PCR set. Upon platform boot, for example, a platform BIOS may perform an inventory of platform resources and "measure" these into the PCR set by storing in the PCR set a hash value associated with each resource. The OS, the software application, and other software or hardware may subsequently access the PCR set to retrieve a cryptographic history of the previous measurements.

A virtual machine (VM) computing platform may attempt to manage multiple BIOS, OS, software applications, or other entities attempting to use a single platform resource. However, when two or more entities running on the VM computing platform attempt to write to the PCR set, data collision may occur. That is, one entity may overwrite another; or the source of the PCR set contents may be ambiguous after more than one entity writes to the PCR set.

DETAILED DESCRIPTION

Figure 1:
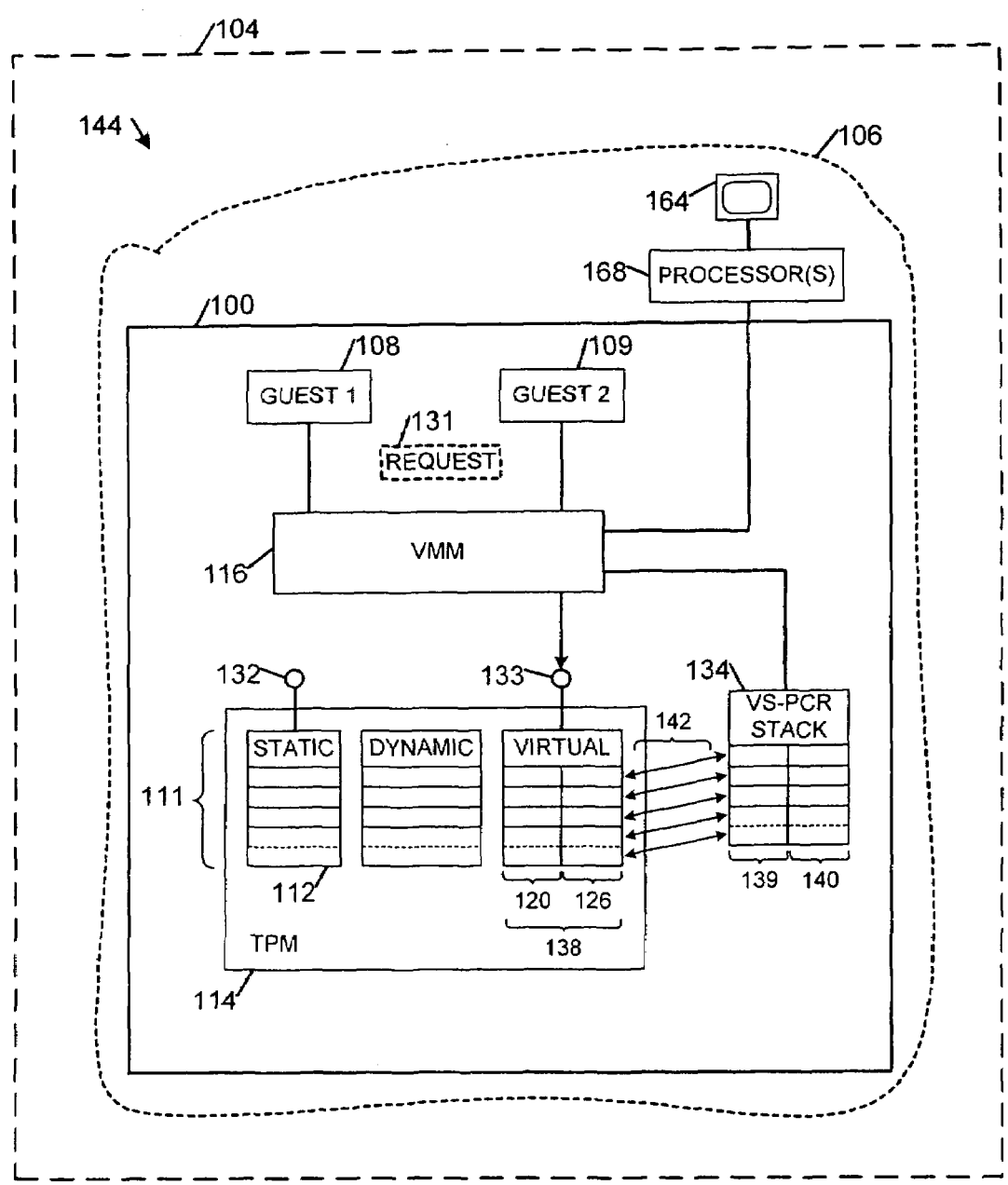
FIG. 1 is a block diagram of an apparatus and a representative system according to various embodiments of the invention.

FIG. 1 comprises a block diagram of an apparatus 100 and a system 160 according to various embodiments of the invention. A virtualized computing platform may comprise one or more processors executing multiple OS or applications such that each OS or application operates as though it were in sole control of memory, input/output devices, and other resources ("virtualized resources") associated with the platform, to decrease conflicts between the multiple OS or applications for the resources. Thus, the virtualized computing platform 104 may virtualize platform resources 106 such that each of a first platform guest 108 and a second platform guest 109 operates as though it were in sole control of the platform resources 106. A platform guest may comprise an operating system, a software application, a firewall kernel, or a processor and memory, among others. Various embodiments described herein may operate to virtualize TPM resources 111 for use by the virtualized computing platform 104.

The apparatus 100 may include a TPM 114 and a virtual machine monitor (VMM) 116 coupled to the TPM 114 to virtualize the TPM resources 111. The VMM 116 may comprise a module, including perhaps a software monitor, capable of managing requests for the TPM resources 111 received from the first guest 108 or from the second guest 109, including routing the requests to the appropriate TPM resource 111.

The apparatus 100 may also include one or more of a first virtual static PCR (VS-PCR) set 120 and a second VS-PCR set 126 coupled to the VMM 116. The first VS-PCR set 120, the second VS-PCR set 126, or both may comprise a set of hardware and/or firmware registers; and these may be located within the TPM 114. In some embodiments of the apparatus 100, the contents of the first VS-PCR set 120, the second VS-PCR set 126, or both may be reset at a time when the TPM 114 resets.

The first platform guest 108 may be coupled to the VMM 116 and associated with the first VS-PCR set 120, and the second platform guest 109 may be coupled to the VMM 116 and associated with the second VS-PCR set 126. The first platform guest 108, the second platform guest 109, or both may comprise an operating system, a software application, and/or a processor and memory, as previously mentioned, and may operate under control of the VMM 116.

The VMM 116 may redirect a request 131 received from the guests 108, 109 to use the PCR set 112 located at a TPM port 132. The request may be redirected to the respective VS-PCR set 120, 126 located at a TPM port 133, with which the VMM 116 has associated the guests 108, 109, respectively. The TPM ports 132, 133 may be localized by the VMM 116 using various methods that may be platform dependent, including memory mapping. Thus, the VMM 116 may cause the VS-PCR sets 120, 126 to be available to the platform guests 108, 109 respectively, upon request from the guest 108 or from the guest 109 to use the PCR set 112.

The apparatus 100 may further include a VS-PCR stack 134 coupled to the TPM 114 to store register contents 138 associated with the first VS-PCR set 120, the second VS-PCR set 126, or both. The VS-PCR stack 134 may comprise stack memory sets 139, 140 corresponding to the VS-PCR sets 120, 126 and the platform guests 108, 109, respectively. Data 142 may be transferred back and forth between any of the VS-PCR sets 120, 126 and the stack memory sets 139, 140. The VS-PCR stack 134 may thus provide memory (e.g., semiconductor memory or disk drive storage) to virtualize TPM resources for a quantity of the guests 108, 109, wherein the quantity of the guests 108, 109 is unknown at the time of designing a TPM memory space.

The first platform guest 108, the second platform guest 109, and their respective relationships to the VS-PCR 120, 126 may therefore be representative of a variable number of guests operating in a virtualized environment 144. The guest 108 may, for example, issue a request 131 to the TPM 114 to use the PCR set 112 located at TPM port 132. The VMM 116 may intercept the request 131 and re-map it to TPM port 133.

The VMM 116 may also map the guest 108 to the particular VS-PCR set 120, such that the contents of the VS-PCR set 120 are available to the guest 108. Stack memory sets 139, 140 may also be available to the guest 108, via transfers of data 142 between the VS-PCR set 120 and the stack memory set 139, the stack memory set 140, or both.

Other embodiments may be realized. For example, a system 160 may include one or more of the apparatus 100, including a TPM 114, a VMM 116 coupled to the TPM to virtualize TPM resources 111, and a first VS-PCR set 120, a second VS-PCR set 126, or both coupled to the VMM 116, as previously described. The system 160 may also include a display 164 coupled to the VMM 116, perhaps to display information processed by processor(s) 168, or to display contents of the TPM 114. The display 164 may comprise a cathode ray tube display, or a solid-state display, such as a liquid crystal display, a plasma display, and a light-emitting diode display, among others.

The system 160 may further include a first platform guest 108 coupled to the VMM 116 and associated with the first VS-PCR set 120, and a second platform guest 109 coupled to the VMM 116 and associated with the second VS-PCR set 126. The first platform guest 108 and the second platform guest 109 may comprise an operating system, a software application, a firewall kernel, or a processor and memory, for example.

In some embodiments of the system 160, the first platform guest 108 and the second platform guest 109 may comprise para-virtualized guests, designed to interoperate with the VMM 116, another platform guest, or both. A para-virtualized guest may comprise a guest 108, 109 designed to operate in a virtualized environment 144. That is, the para-virtualized guest may be designed to interoperate with other guests 108, 109 to decrease conflicts for platform resources. In contrast, guests that have not been para-virtualized may depend more completely upon the VMM 116 to coordinate their operation in the virtualized environment 144 to avoid data collision.

The system 160 may also include a VS-PCR stack 134 coupled to the TPM 114 to store register contents 138 associated with at least one of the first VS-PCR set 120 and the second VS-PCR set 126.

Any of the components previously described can be implemented in a number of ways, including embodiments in software. Thus, the apparatus 100; computing platform 104; platform resources 106; guests 108, 109; trusted platform module (TPM) resources 111; platform configuration register (PCR) sets 112, 120, 126; TPM 114; virtual machine monitor (VMM) 116; request 131; TPM ports 132, 133; PCR stack 134; register contents 138; stack memory sets 139, 140; data 142; virtualized environment 144; system 160; display 164; and processor(s) 168 may all be characterized as "modules" herein.

The modules may include hardware circuitry, single or multi-processor circuits, memory circuits, software program modules and objects, firmware, and combinations thereof, as desired by the architect of the apparatus 100 and system 160 and as appropriate for particular implementations of various embodiments. Thus, the modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. These simulations may be used to characterize or test the embodiments, for example.

It should also be understood that the apparatus and systems of various embodiments can be used in applications other than virtualizing PCR set functionality for use by a virtualized computing platform. Thus, various embodiments of the invention are not to be so limited. The illustrations of apparatus 100 and system 160 are intended to provide a general understanding of the structure of various embodiments, and are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
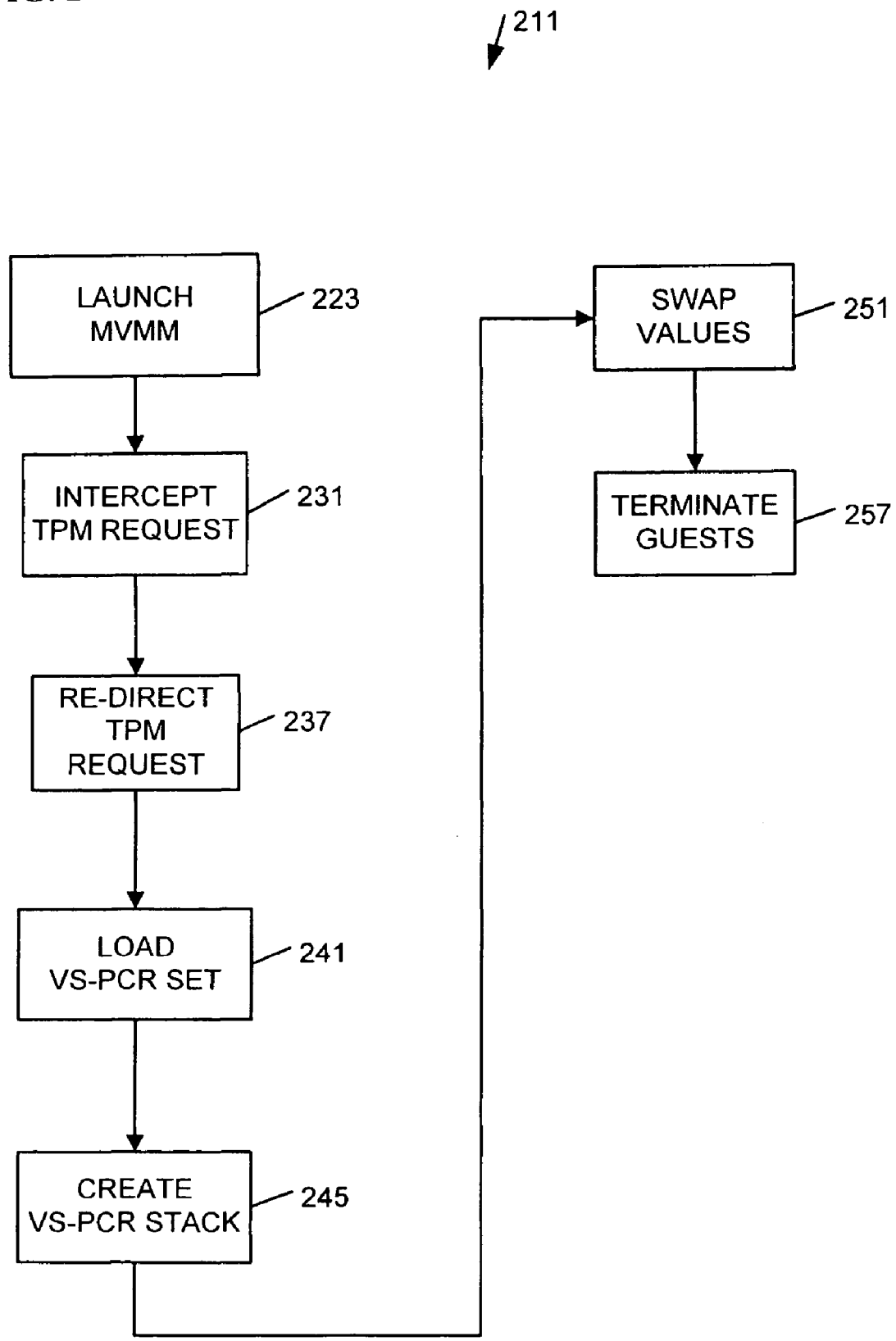
FIG. 2 is a flow diagram illustrating several methods according to various embodiments of the invention.

FIG. 2 is a flow diagram illustrating several methods 211 according to various embodiments of the invention. One such method 211 may begin at block 223 with launching a VMM from a BIOS, a first platform guest, or a second platform guest. The VMM may comprise a module capable of executing at a time when no operating system is active.

The method 211 may continue with intercepting a first request to use a PCR directed to a first TPM port, a second request to use the PCR directed to the first TPM port, or both, at block 231. The first request to use the PCR may be received from the first platform guest and the second request to use the PCR may be received from the second platform guest. A guest may include an operating system, a software application, and/or a memory and processor, perhaps running under VMM control, as previously described.

The method 211 may include re-directing the first request to use the PCR, the second request to use the PCR, or both to a second TPM port capable of accessing one or both of a first VS-PCR set and a second VS-PCR set, at block 237. The first VS-PCR set, the second VS-PCR set, or both may comprise a set of hardware and/or firmware registers, possibly located within the TPM. The first TPM port may comprise a TPM access path associated with a first platform-imposed trust level, and the second TPM port may comprise a TPM access path associated with a second platform-imposed trust level.

The method 211 may proceed at block 241 with loading values into the first VS-PCR set, the second VS-PCR set, or both. The first VS-PCR may be associated with the first platform guest and the second VS-PCR set may be associated with the second platform guest; and the associations may be maintained by the VMM. The method 211 may also include creating a VS-PCR stack, at block 245, and swapping VS-PCR values between at least one of the first VS-PCR set, the second VS-PCR set, and the VS-PCR stack, at block 251. The method 211 may conclude at block 257 with terminating execution of the first platform guest, the second platform guest, or both, under VMM control.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Figure 3:
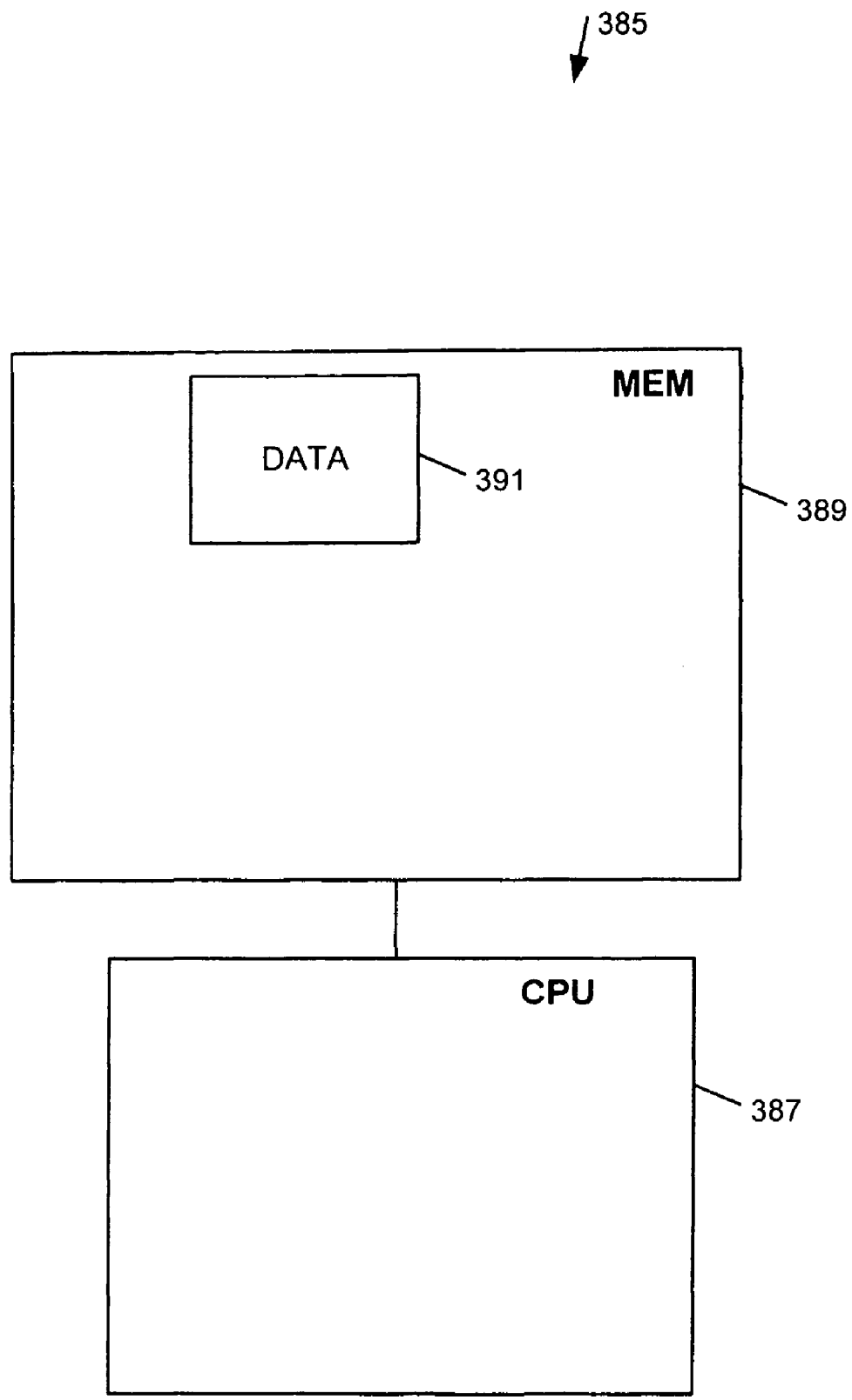
FIG. 3 is a block diagram of an article according to various embodiments of the invention.

Thus, other embodiments may be realized. For example, FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including an electrical, or optical conductor. The medium may contain associated information 391 (e.g., computer program instructions, data, or both) which, when accessed, results in a machine (e.g., the processor(s) 387) intercepting a first request to use a PCR directed to a first TPM port, a second request to use the PCR directed to the first TPM port, or both.

Other activities may include re-directing the first request to use the PCR, the second request to use the PCR, or both to a second TPM port capable of accessing a first VS-PCR set, a second VS-PCR set, or both. Additional activities may include launching a VMM from at least one of a BIOS and a platform guest. The VMM may comprise a module, including perhaps a software monitor capable of executing at a time when no operating system is active, as previously described.

Implementing the apparatus, systems, and methods disclosed herein may operate to virtualize PCR functionality for use by a virtualized computing platform, perhaps reducing the number of data collisions that might be incurred using a non-virtualized PCR.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a trusted platform module including a static platform configuration register set, each static platform configuration register to store information associated with a corresponding trusted platform module resource;
   a virtual machine monitor locally coupled to the trusted platform module, the virtual machine monitor to redirect requests for trusted platform module resources from a plurality of platform guests to the static platform configuration register set via at least one of a first virtual static platform configuration register set and a second virtual static platform configuration register set coupled to the virtual machine monitor, the first and second virtual static platform configuration register sets each separate from the static platform configuration register set and operable to store the requests redirected from a first platform guest and a second platform guest, respectively.

2. The apparatus of claim 1, wherein the at least one of the first virtual static platform configuration register set and the second virtual static platform configuration register set comprises at least one of a set of hardware registers and a set of firmware registers.

3. The apparatus of claim 2, wherein the at least one of a set of hardware registers and a set of firmware registers is located within the trusted platform module.

4. The apparatus of claim 1, wherein the contents of the at least one of the first virtual static platform configuration register set and the second virtual static platform configuration register set are reset at a time when the trusted platform module resets.

5. The apparatus of claim 1, further including:
   a virtual static platform configuration register stack coupled to the trusted platform module to store register contents associated with the at least one of the first virtual static platform configuration register set and the second virtual static platform configuration register set.

6. The apparatus of claim 1, wherein at least one of the first platform guest and the second platform guest comprises at least one of an operating system a software application, and a combination of a processor and memory.

7. The apparatus of claim 1, wherein at least one of the first platform guest and the second platform guest operates under control of the virtual machine monitor.

8. A system, including:
- a trusted platform module including a static platform configuration register set, each static platform configuration register to store information associated with a corresponding trusted platform module resource;
- a virtual machine monitor locally coupled to the trusted platform module to redirect requests for trusted platform module resources from a plurality of platform guests to the static platform configuration register set via at least one of a first virtual static platform configuration register set and a second virtual static platform configuration register set coupled to the virtual machine monitor, the first and second virtual static platform configuration register sets each separate from the static platform configuration register set and operable to store the requests redirected from a first platform guest and a second platform guest, respectively; and
- a solid-state display coupled to the virtual machine monitor.

9. The system of claim 8, wherein at least one of the first platform guest and the second platform guest comprises at least one of an operating system a software application, and a combination of a processor and memory.

10. The system of claim 9, wherein the application comprises a firewall kernel.

11. The system of claim 8, wherein at least one of the first platform guest and the second platform guest comprises a para-virtualized guest to interoperate with at least one of the virtual machine monitor and another platform guest.

12. The system of claim 8, further including:
- a virtual static platform configuration register stack coupled to the trusted platform module to store register contents associated with at least one of the first virtual static platform configuration register set and the second virtual static platform configuration register set.

13. A method, including:
- using one or more processors to execute instructions retained in a machine-readable medium to perform at least some portion of the following:
- launching a virtual machine monitor, a first platform guest, and a second platform guest, wherein the first platform guest and the second platform guest are coupled to the virtual machine monitor and wherein the virtual machine is locally coupled to a trusted platform module including a static platform configuration register set, each static platform configuration register to store information associated with a corresponding trusted platform module resource;
- intercepting at least one of a first request to use the static platform configuration register set directed to a first trusted platform module port of the trusted platform module and a second request to use the static platform configuration register set directed to the first trusted platform module port; and
- re-directing at least one of the first request to use the static platform configuration register set and the second request to use the static platform configuration register set to a second trusted platform module port of the trusted platform module, the second trusted platform module port capable of accessing at least one of a first virtual static platform configuration register set and a second virtual static platform configuration register set, the first and second virtual static platform configuration register sets each separate from the platform configuration register and operable to store requests redirected from a first platform guest and a second platform guest, respectively.

14. The method of claim 13, wherein the first trusted platform module port comprises a trusted platform module access path associated with a first platform-imposed trust level, and the second trusted platform module port comprises a trusted platform module access path associated with a second platform-imposed trust level.

15. The method of claim 13, further including:
- loading at least one of the first virtual static platform configuration register set and the second virtual static platform configuration register set.

16. The method of claim 15, further including:
- terminating execution of at least one of the first platform guest and the second platform guest under control of the virtual machine monitor.

17. The method of claim 13, wherein at least one of the first virtual static platform configuration register set and second virtual static platform configuration register set comprises at least one of a set of hardware registers and a set of firmware registers located within the trusted platform module.

18. The method of claim 13, further including:
- creating a virtual static platform configuration register stack.

19. An article including a machine-accessible medium having associated information, wherein the information, when accessed, results in a machine performing:
- launching a virtual machine monitor, a first platform guest, and a second platform guest, wherein the first platform guest and the second platform guest are coupled to the virtual machine monitor and wherein the virtual machine is locally coupled to a trusted platform module including a static platform configuration register set, each static platform configuration register to store information associated with a corresponding trusted platform module resource;
- intercepting at least one of a first request to use the static platform configuration register set directed to a first trusted platform module port of the trusted platform module and a second request to use the static platform configuration register set directed to the first trusted platform module port; and
- re-directing at least one of the first request to use the static platform configuration register set and the second request to use the static platform configuration register set to a second trusted platform module port of the trusted platform module, the second trusted platform module port capable of accessing at least one of a first virtual static platform configuration register set and a second virtual static platform configuration register set, the first and second virtual static platform configuration register sets each separate from the platform configuration register and operable to store requests redirected from a first platform guest and a second platform guest, respectively.

20. The article of claim 19, wherein the virtual machine monitor comprises a software monitor capable of executing at a time when no operating system is active.

* * * * *

UNITED STATES PATENT AND TRADEMARK OFFICE
CERTIFICATE OF CORRECTION

PATENT NO.      : 7,707,629 B2                                                          Page 1 of 1
APPLICATION NO. : 11/095034
DATED           : April 27, 2010
INVENTOR(S)     : David W. Grawrock It is certified that error appears in the above-identified patent and that said Letters Patent is hereby corrected as shown below:

In column 6, line 63, in Claim 6, after "system" insert -- , --.

In column 7, line 22, in Claim 9, after "system" insert -- , --.

Signed and Sealed this

Fifteenth Day of June, 2010

David J. Kappos
*Director of the United States Patent and Trademark Office*